United States Patent
Torvinen

(10) Patent No.: US 8,988,557 B2
(45) Date of Patent: *Mar. 24, 2015

(54) SYSTEM AND METHOD FOR AUTOMATIC FORMAT SELECTION FOR DIGITAL PHOTOGRAPHS

(71) Applicant: Core Wireless Licensing S.A.R.L., Luxembourg (LU)

(72) Inventor: Marko Torvinen, Tampere (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,481

(22) Filed: Aug. 18, 2014

(65) Prior Publication Data

US 2014/0354849 A1    Dec. 4, 2014

Related U.S. Application Data

(63) Continuation of application No. 13/270,376, filed on Oct. 11, 2011, now Pat. No. 8,842,199, which is a continuation of application No. 11/010,984, filed on Dec. 13, 2004, now Pat. No. 8,040,395.

(51) Int. Cl.
| | |
|---|---|
| *H04N 5/76* | (2006.01) |
| *H04N 1/00* | (2006.01) |
| *H04N 1/21* | (2006.01) |
| *H04N 101/00* | (2006.01) |

(52) U.S. Cl.
CPC .............. *H04N 1/00005* (2013.01); *H04N 1/00* (2013.01); *H04N 1/00039* (2013.01); *H04N 1/0005* (2013.01); *H04N 1/00063* (2013.01); *H04N 1/00082* (2013.01); *H04N 1/2112* (2013.01); *H04N 2101/00* (2013.01); *H04N 2201/212* (2013.01); *H04N 5/76* (2013.01)
USPC .................................................... 348/231.99

(58) Field of Classification Search
CPC . H04N 5/23212; H04N 5/2329; H04N 5/235; H04N 5/77; H04N 5/772; H04N 1/1112
USPC ........ 348/207.2, 231.99–231.2, 231.7–231.9; 382/168, 234, 305
See application file for complete search history.

(56) References Cited

U.S. PATENT DOCUMENTS 8,842,199 B2 * 9/2014 Torvinen ................... 348/231.99

* cited by examiner

*Primary Examiner* — Timothy J Henn
(74) *Attorney, Agent, or Firm* — Winstead PC

(57) ABSTRACT

A system and method for automatically determine whether an image captured by a digital camera should be stored in a raw format or a compressed format. After an image is captured by the digital camera, the digital camera checks certain sets of characteristics of the captured image to check the image quality. If the image quality falls within an acceptable range, then the digital camera saves the image in a compressed format. If the captured image does not fall within predetermined quality levels, then the captured image is save in raw format for later processing.

20 Claims, 2 Drawing Sheets

SYSTEM AND METHOD FOR AUTOMATIC FORMAT SELECTION FOR DIGITAL PHOTOGRAPHS

CROSS REFERENCE TO RELATED APPLICATIONS

This application is a continuation of U.S. patent application Ser. No. 13/270,376, filed on Oct. 11, 2011. U.S. patent application Ser. No. 13/270,376 is a continuation of U.S. patent application Ser. No. 11/010,984, filed on Dec. 13, 2004 which is now U.S. Pat. No. 8,040,395. U.S. patent application Ser. No. 13/270,376 and U.S. Pat. No. 8,040,395 are incorporated herein by reference

FIELD OF THE INVENTION

The present invention relates generally to digital photography. More particularly, the present invention relates to the storage of digital photographs in different formats.

BACKGROUND OF THE INVENTION

In digital cameras and devices such as portable telephones that include digital cameras, it is often possible to save images in different formats. Commonly, a digital camera will save a photograph in a .jpg format or a similar compressed format. Using this method, the digital camera's processor obtains raw data from a camera sensor and processes the data with the information that is available to the processor. In this situation, the quality of the image that is ultimately viewable to the user is primarily dependent upon the quality of the processing algorithms that are used in digital camera or other devices such as portable telephones with built-in digital cameras.

An alternative to using a compressed format is to directly save the raw, uncompressed, image to a memory card. Subsequently, the user can "develop" the digital image using any appropriate software and/or edit the picture as desired or necessary. Because the original image is not compressed, there are several third-party software programs that can produce a higher-quality picture using the raw data than would otherwise be possible with a compressed picture.

Although raw images may ultimately produce better pictures than compressed images, they do have a number of drawbacks. For example, when compared to .jpg images, raw images require the use of a personal computer and conversion software to successfully display the picture in its final form. This requires significantly more effort on the user's part than is the case when a compressed image is used. Additionally, raw images require significantly more storage space than compressed images. For example, inside many digital cameras, raw images require up to about three times as much storage space as compressed images. Furthermore, when a user ultimately processes a raw image, he or she often also decides to preserve the original raw data in case he or she wants to convert the image again in order to improve picture quality. Furthermore, in non-extreme lighting environments, such as indoors with several types of artificial light, compressed .jpg images can ultimately be of higher quality than raw images. In more extreme environments, however, using a raw image can ultimately lead to a picture of higher quality than a compressed image.

Given the above-identified considerations, it is apparent that there are some situations where it is preferable to use raw images to obtain high-quality digital pictures, while in other situations the use of compressed images may prove superior. Currently, a number of conventional digital cameras include the ability for the user to alter whether a raw image or a compressed image is stored on the device's memory card. However, these settings cannot be changed during the picture-taking process. As a result, a user could take a photograph in a compressed format and not realize until later that, due to the lighting conditions or another reason, it would have been preferable to capture the raw image instead. Alternatively, a user may take a picture in the raw format when it is not necessary, consuming potentially valuable file space.

SUMMARY OF THE INVENTION

The present invention involves a system and method for an electronic device to automatically determine whether a picture is to be taken in a raw format or a compressed format. Upon taking a picture, the device determines whether the image is of a satisfactory quality. If the image is of a satisfactory quality, than the image is stored in a compressed form. If the image is of a relatively poor quality, then the image is stored in a partially-compressed form or a raw form.

The present invention provides a number of distinct advantages over the prior art. For example, the present invention gives a user significantly more freedom when taking pictures than is otherwise possible with conventional systems. The user does not have to constantly worry about image quality with a device incorporating the present invention, as the device itself automatically determines the optimal format for a particular picture. Additionally, the present invention ultimately saves file space by only saving images in a raw form when necessary.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
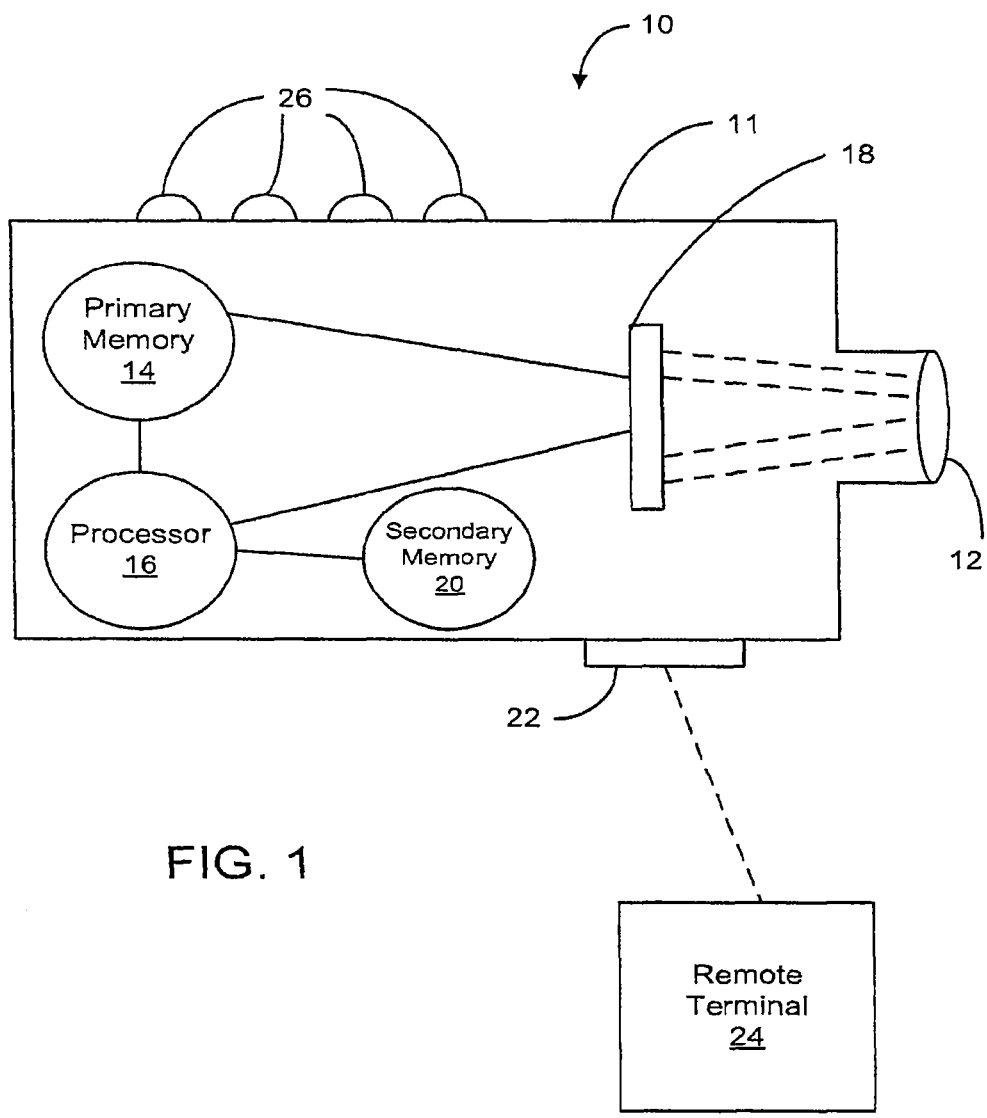
FIG. 1 is a sectional side view of a generic digital camera according to the principles of the present invention.

A generic digital camera according to the principles of the present invention is shown at 10 in FIG. 1. The digital camera 10 can be a stand-alone device or can be incorporated into another electronic device, such as a portable telephone. The digital camera 10 includes a housing 11 which contains at least one lens 12, a primary memory unit 14, a processor 16, and at least one image sensor 18. The primary memory unit 14 can be used to store digital images and computer software for performing various functions in the digital camera, as well as to implement the present invention. A removable, secondary memory unit 20 in the form of a memory card can also be included in the digital camera to provide extra memory space. The image sensor 18 can be a charge coupled device (CCD), a complementary metal oxide semiconductor (CMOS), or another system.

When a digital picture is taken, the at least one lens 12 focuses the image onto the at least one image sensor 18 which records light electronically. The processor 16 then breaks this electronic information down into digital data which can be stored on the primary memory unit 14 and/or the secondary memory unit 20. The digital camera 10 also includes a data communication port 22 to enable the transmission of digital images from the digital camera 10 to a remote terminal such as a personal computer 24. The data communication can be in either wired or wireless form and can be configured for USB, BlueTooth, infrared or other connections. The digital camera 10 also includes one or more input buttons 26 for entering information and/or taking a picture, although input buttons 26 could also be remote from the digital camera 10.

The present invention provides a system and method wherein the digital camera 10 can determine whether it would be preferable to save a captured image in either a compressed format or as a raw image. This determination is made after the image is captured but before it is saved onto the primary memory unit 14 and/or the secondary memory unit 20.

Figure 2:
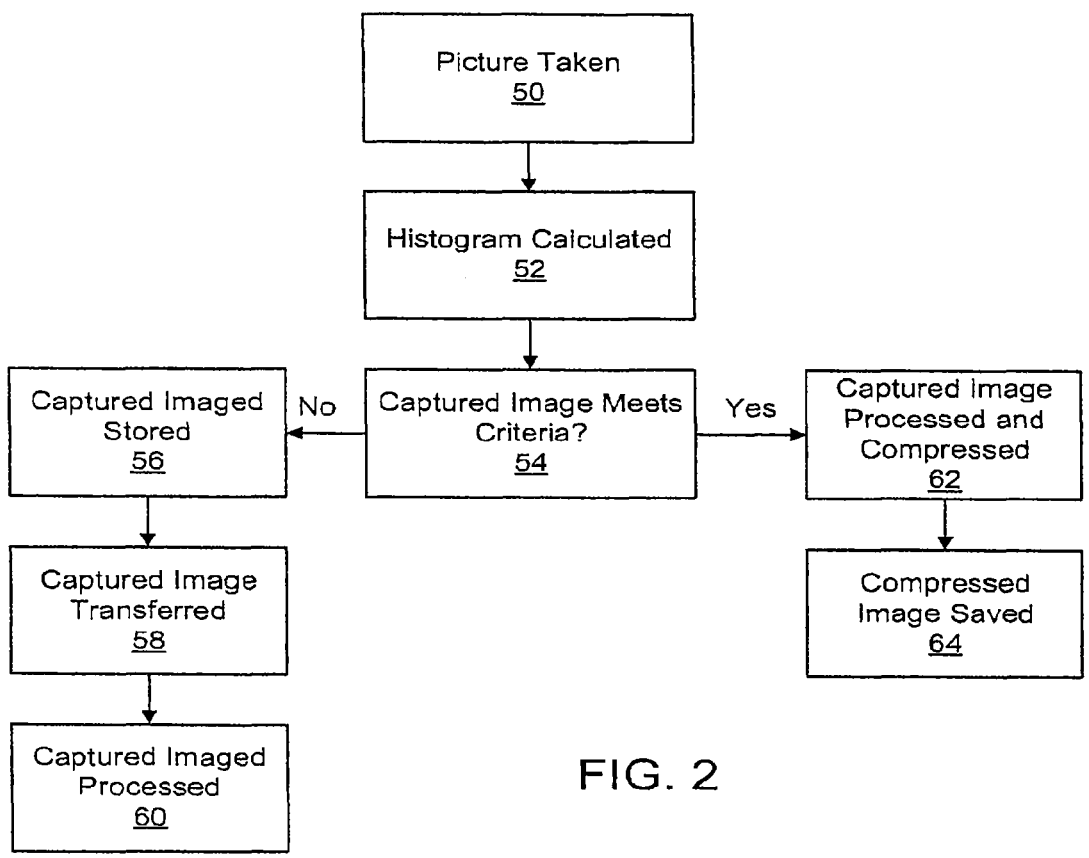
FIG. 2 is a flow chart showing the process for selecting the appropriate image format for saving on the digital camera according to one embodiment of the present invention.

FIG. 2 shows the process for the digital camera 10 to determine the proper format for a picture according to one embodiment of the present invention. At step 50, the user takes a picture by actuating an input button 26. At step 52, the processor 16 calculates a histogram of the captured image. At step 54, the processor 16 uses the histogram to determine whether the captured image meets a set of predetermined criteria for saving the image in raw or compressed form. These criteria, in one embodiment of the invention, are based upon settings stored on the primary memory unit 14. It is possible for these settings to either be fixed or be modifiable by the user. If the captured image does not meet the criteria for compression, then at step 56 the captured image is directly stored on either the primary memory unit 14 or the secondary memory unit 20. The captured image can then be transferred to the remote device 24 at step 58 and processed using third party software at step 60. It should also be noted, however, that the step 60 of processing the image does not necessarily have to occur at a remote device. Instead, it is also possible for the processing to occur within the digital camera 10 or a camera-containing electronic device. If, on the other hand, the captured image meets the predetermined criteria for compression, then at step 62, the processor 16 processes and compresses the captured image. At step 64, the compressed image is saved to primary memory unit 14 or the secondary memory unit 20. The compressed image can be stored in .jpg form, or another file format can be used. In addition and in one embodiment of the invention, the digital camera 10 can also include programming for repairing problems with the captured image.

In addition to the above, the predetermined criteria could also be substantially reversed, such that meeting the criteria results in the image being saved in raw form and a failure to meet the criteria causes the image to be saved in compressed form. Additionally, it is also possible that, instead of saving in either a raw or a compressed form, the processor can save in either a fully-compressed or partially-compressed form depending upon quality of the image, or it could choose between different compressed formats. Furthermore, the processor could also choose between three or more options (such as raw, partially-compressed or fully-compressed) depending upon the particular settings of the digital camera.

In determining whether the captured image should be saved in the raw format or as a compressed image, there are several potential considerations. For example, if the captured image was severely underexposed, the processor 16 could have the captured image saved "as is" (as a raw image) because external and/or third party software often has better capabilities for correcting underexposure on a raw image than a compressed image. Additionally, the processor could also determine whether the white balance on the captured image meets certain criteria, with relatively poor picture quality leading the processor 16 to save the captured image in raw form. This is accomplished by comparing the levels of red, green, and blue in order to determine whether the white balance is faulty. The processor 16 can also search for white areas on the captured image in order to determine whether the white balance algorithm is capable of finding the correct white balance.

In one embodiment of the invention, the user has a variety of options for the predetermined criteria that is used to determine whether an image should be compressed. For example, the user could choose between (1) a "preferred compressed" option; (2) an "auto" option; and (3) a "preferred raw" option. Under the "preferred compressed" option, an image would automatically be saved in the compressed format, such as a .jpg image, unless there were severe faults or problems with the raw image. Under the "auto" option, the system would make an automatic determination of each captured image. Under the "preferred raw" option, the image will not be compressed unless the quality of the image is very high. Other permutations of these options are also possible.

In implementing the present invention, if the digital camera 10 obtains any indication that there may be a problem in the captured image, the digital camera 10 has the capability to save the captured image in a raw format for later processing. Alternatively, if there are no substantial issues with the captured image, the digital camera can automatically save the image in a compressed form, saving file space on the primary memory unit 14 and/or the secondary memory unit 20. Additionally, and in one embodiment of the invention, the user has the ability to enter a default setting for the handling of captured images. In another embodiment, the user can also set the digital camera 10 to store both the raw image and the compressed image. The present invention can be implemented and managed through user profiles, providing users with the ability to enable or disable the invention as necessary or desired.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

While several embodiments have been shown and described herein, it should be understood that changes and modifications can be made to the invention without departing from the invention in its broader aspects. Various features of the invention are defined in the following Claims.

What is claimed is:

1. A method for saving an image on a digital camera, comprising:

determining whether an image quality of a captured image meets predetermined criteria based on a histogram of the captured image;

if the image quality of the captured image does not fall within the predetermined criteria, saving the image to a memory unit in a first form;

if the image quality of the captured image does fall within the predetermined criteria, saving the image to the memory unit in a second form;

wherein the predetermined criteria comprises at least one of:

whether the captured image is underexposed; and whether a white balance in the captured image is within a satisfactory range.

2. The method of claim 1, wherein the first form comprises a raw, uncompressed form, and wherein the second form comprises a compressed form.

3. The method of claim 2, wherein if the image quality of the captured image does fall within the predetermined criteria, the image is compressed into a .jpg format.

4. The method of claim 1, comprising capturing the image using at least one lens to focus the image onto at least one image sensor.

5. The method of claim 4, wherein the at least one image sensor comprises a charge coupled device.

6. The method of claim 4, wherein the at least one image sensor comprises a complementary metal oxide semiconductor.

7. The method of claim 1, comprising calculating the histogram of the captured image.

8. The method of claim 1, wherein the predetermined criteria are modifiable by a user.

9. The method of claim 1, comprising transferring the captured image to a remote terminal.

10. The method of claim 1, comprising, if the captured image is saved to the memory unit in raw form, using third party software to process the raw captured image.

11. The method of claim 10, wherein the raw captured image is processed at a remote terminal.

12. The method of claim 10, wherein the raw captured image is processed within the digital camera.

13. The method of claim 1, wherein determining whether the image quality of the captured image meets predetermined criteria is selectively enabled and disabled through a user profile in the digital camera.

14. The method of claim 1, comprising repairing deficiencies in the captured image.

15. A non-transitory computer readable medium embodied with a computer program for saving an image on a digital camera, the computer program comprising:

computer code configured to determine whether an image quality of a captured image meets predetermined criteria based on a histogram of the captured image;

computer code configured to, if the image quality of the captured image does not fall within the predetermined criteria, save the image to a memory unit in a first form;

computer code configured to, if the image quality of the captured image does fall within the predetermined criteria, save the image to the memory unit in a second form;

wherein the predetermined criteria comprises at least one of:

whether the captured image is underexposed; and whether a white balance in the captured image is within a satisfactory range.

16. The computer readable medium of claim 15, comprising computer code configured to capture the image using at least one lens to focus the image onto at least one image sensor.

17. The computer readable medium of claim 15, comprising computer code configured to calculate the histogram of the captured image.

18. A device for taking digital images, comprising:

a housing;

a lens positioned within the housing for focusing an image;

a sensor unit receiving the image focused by the lens; and a memory unit operatively connected to a processor, the memory unit comprising:

computer code configured to determine whether an image quality of a captured image meets predetermined criteria based on a histogram of the captured image;

computer code configured to, if the image quality of the image does not fall within the predetermined criteria, save the image to a memory unit in a first form;

computer code configured to, if the image quality of the image does fall within the predetermined criteria, save the image to the memory unit in a second form;

wherein the predetermined criteria comprises at least one of:

whether the captured image is underexposed; and whether a white balance in the captured image is within a satisfactory range.

19. The device of claim 18, wherein the memory unit comprises computer code configured to transfer the captured image to a remote terminal.

20. The device of claim 18, wherein the memory unit comprises computer code configured to repair deficiencies in the captured image.

* * * * *